(12) United States Patent
Hino et al.

(10) Patent No.: US 12,163,847 B2
(45) Date of Patent: Dec. 10, 2024

(54) CONTROLLER AND CONTROL METHOD

(71) Applicant: Mitsubishi Electric Corporation, Tokyo (JP)

(72) Inventors: Tatsuro Hino, Tokyo (JP); Kazuya Hasegawa, Tokyo (JP); Kengo Kumagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 407 days.

(21) Appl. No.: 17/565,625

(22) Filed: Dec. 30, 2021

(65) Prior Publication Data
US 2022/0299377 A1    Sep. 22, 2022

(30) Foreign Application Priority Data

Mar. 18, 2021 (JP) .................. 2021-044677

(51) Int. Cl.
*G01K 3/06* (2006.01)
*G01K 3/04* (2006.01)
*G05B 9/02* (2006.01)
*H02M 1/00* (2006.01)
*H02M 7/537* (2006.01)

(52) U.S. Cl.
CPC ............... *G01K 3/06* (2013.01); *G01K 3/04* (2013.01); *G05B 9/02* (2013.01); *H02M 1/0003* (2021.05); *H02M 7/537* (2013.01)

(58) Field of Classification Search
CPC ........... G01K 3/06; G01K 3/04; G01K 7/42; G05B 9/02; H02M 1/0003; H02M 1/327; H02P 29/60; H02P 29/64; B62D 5/0496
See application file for complete search history.

(56) References Cited

U.S. PATENT DOCUMENTS

| | | | | |
|---|---|---|---|---|
| 4,836,442 A | * | 6/1989 | Beckey | G05D 23/275 236/46 R |
| 2009/0314069 A1 | * | 12/2009 | Mitchell | G01K 13/02 374/E7.004 |
| 2018/0136051 A1 | * | 5/2018 | Ishii | G01K 1/20 |
| 2019/0350462 A1 | * | 11/2019 | Biederman | G01K 7/42 |
| 2022/0026967 A1 | * | 1/2022 | Gu | G06F 1/206 |

FOREIGN PATENT DOCUMENTS

JP    2017-063540 A    3/2017

* cited by examiner

*Primary Examiner* — Mong-Shune Chung
(74) *Attorney, Agent, or Firm* — Sughrue Mion, PLLC; Richard C. Turner

(57) ABSTRACT

To provide a controller and a control method which can estimate a temperature of the temperature estimation with good accuracy without depending on detection information of other sensors other than the temperature sensor, even if the temperature sensor is attached to a position away from the temperature estimation point. A controller is provided with a sensor temperature detector that detects a sensor temperature based on an output signal of a temperature sensor attached to a temperature estimation object; and a temperature estimator that calculates an estimated temperature of the temperature estimation point, based on the current detection value of sensor temperature or the current correction value of sensor temperature, the detection value of sensor temperature before the step time or the correction value of sensor temperature before the step time, and a thermal time constant.

16 Claims, 9 Drawing Sheets

CONTROLLER AND CONTROL METHOD

INCORPORATION BY REFERENCE

The disclosure of Japanese Patent Application No. 2021-44677 filed on Mar. 18, 2021 including its specification, claims and drawings, is incorporated herein by reference in its entirety.

BACKGROUND

The present disclosure relates to a controller and a control method.

In order to avoid damage by temperature rise of the device, the configuration which attaches the temperature sensor to the device is known widely. The temperature sensor is attached close to a point where temperature becomes highest, or a point where overheat protection is required. The output of the device is limited or stopped when temperature exceeds a predetermined temperature.

However, deviation of temperature occurs between the temperature monitoring point of the device and the sensor part of the temperature sensor, due to the following reasons. As the first reason, since the temperature sensor and the sensor part itself have heat capacity, a response delay occurs in the temperature detection value. As the second reason, thermal resistance exists between the temperature monitoring point and the sensor part, and a temperature difference occurs even in steady state. There are cases where the temperature sensor cannot be arranged close to the temperature monitoring point of the device, due to the restrictions on the structure of the device. If a temperature of coil of the rotary electric machine which high voltage is applied is measured, since an electric insulation member with small thermal conductivity is arranged between the temperature sensor and the coil, thermal resistance becomes large.

When deviation of temperature occurs between the temperature monitoring point and the sensor part, reliability of the device is deteriorated. Accordingly, although it is necessary to set the temperature for limiting or stopping the output to a temperature lower than the heat resistant temperature of the device, the device will be enlarged if the margin is made large. Especially in the rotary electric machine for on-vehicle, since small size and high power are required while maintaining high reliability, it is required to achieve reliability, small size, and higher power at the same time.

In order to solve these requirements, in the technology of JP 2017-63540 A, accuracy of the estimated temperature is improved by (1) calculation of loss, (2) condition determination whether temperature is in rising state or in falling state, (3) selection of the thermal time constant according to condition determination of the speed command value and the current command value, (4) temperature estimation based on the information on above (1) to (3), and the like.

SUMMARY

However, in the technology of JP 2017-63540 A, since many sensors are required other than the temperature sensor for condition determination, cost increases and the physical space for arranging many sensors is required. Accordingly, the device is enlarged. The number of input signals to the controller increases, and the calculation processing load of temperature estimation increases. Accordingly, cost of the controller increases.

In the technology of JP 2017-63540 A, although the calculation of loss is required in the temperature estimation, since various assumptions are included in the calculation, a difference occurs between the actual loss and the calculated loss, and it becomes an error factor of the temperature estimation. Especially, when an unexpected heat generation, such as a short circuit, occurs, large deviation occurs between the actual loss and the calculated loss, and error of the temperature estimation becomes large. Accordingly, considering the abnormal heat generation, it is inevitable to set the determination value for limiting the output to a temperature quite lower than the heat resistant temperature of the device, and enlargement of the device is caused.

Then, the purpose of the present disclosure is to provide a controller and a control method which can estimate a temperature of the temperature estimation point with good accuracy without depending on detection information of other sensors other than the temperature sensor, even if the temperature sensor is attached to a position away from the temperature estimation point.

A controller according to the present disclosure, including:

a sensor temperature detection unit that detects a sensor temperature based on an output signal of a temperature sensor attached to a temperature estimation object; and a temperature estimation unit that calculates an estimated temperature of a temperature estimation point, based on a current detection value of the sensor temperature or a current correction value of sensor temperature calculated based on the current detection value of sensor temperature, a detection value of the sensor temperature before a step time or a correction value of sensor temperature before the step time, and a thermal time constant from a temperature of the temperature estimation point set inside the temperature estimation object to the sensor temperature.

A control method according to the present disclosure, including:

a sensor temperature detection step that detects a sensor temperature based on an output signal of a temperature sensor attached to a temperature estimation object; and a temperature estimation step that calculates an estimated temperature of a temperature estimation point, based on a current detection value of the sensor temperature or a current correction value of sensor temperature calculated based on the current detection value of sensor temperature, a detection value of the sensor temperature before a step time or a correction value of sensor temperature before the step time, and a thermal time constant from a temperature of the temperature estimation point set inside the temperature estimation object to the sensor temperature.

According to the controller and the control method of the present disclosure, by only using the detection value of sensor temperature, based on the sensor temperatures or the correction values of sensor temperature before and after the step time, and the thermal time constant, the temperature of the temperature estimation point can be estimated including a transient response. Since the thermal time constant from the temperature of the temperature estimation point to the sensor temperature is considered, even if there is a distance between the temperature estimation point and the temperature sensor, temperature can be estimated with good accuracy. Therefore, estimation accuracy can be maintained even if the temperature sensor cannot be arranged close to the temperature estimation point. Accordingly, the flexibility of the mounting position of the temperature sensor can be improved.

And, it is not necessary to estimate the heating amount using information other than the detection value of sensor temperature, for example, the current value and the like. Accordingly, a temperature estimation error is prevented from occurring, due to an estimated error of the heating amount due to various kinds of variation factors, such as a manufacturing variation, an aging change, and a condition change, and an estimation error of the heating amount due to unexpected heat generation, such as a short circuit. Therefore, even when a variation of the heating amount due to various kinds of variation factors occurs or even when a unexpected heat generation, such as the short circuit, occurs, temperature can be estimated with good accuracy, based on the detection value of sensor temperature which appears a variation of the heating amount, and system reliability can be improved.

Since the detection value of sensor temperature is used, it is not necessary to use other information, such as the current value, the number of the input signals to the controller can be reduced, and simplification of the device can be achieved. Since calculation using the detection value of sensor temperature is performed, it is not necessary to perform complicated calculation using plural parameters, such as the current value, and calculation processing load can be reduced.

DETAILED DESCRIPTION OF THE EMBODIMENTS

1. Embodiment 1

Figure 1:
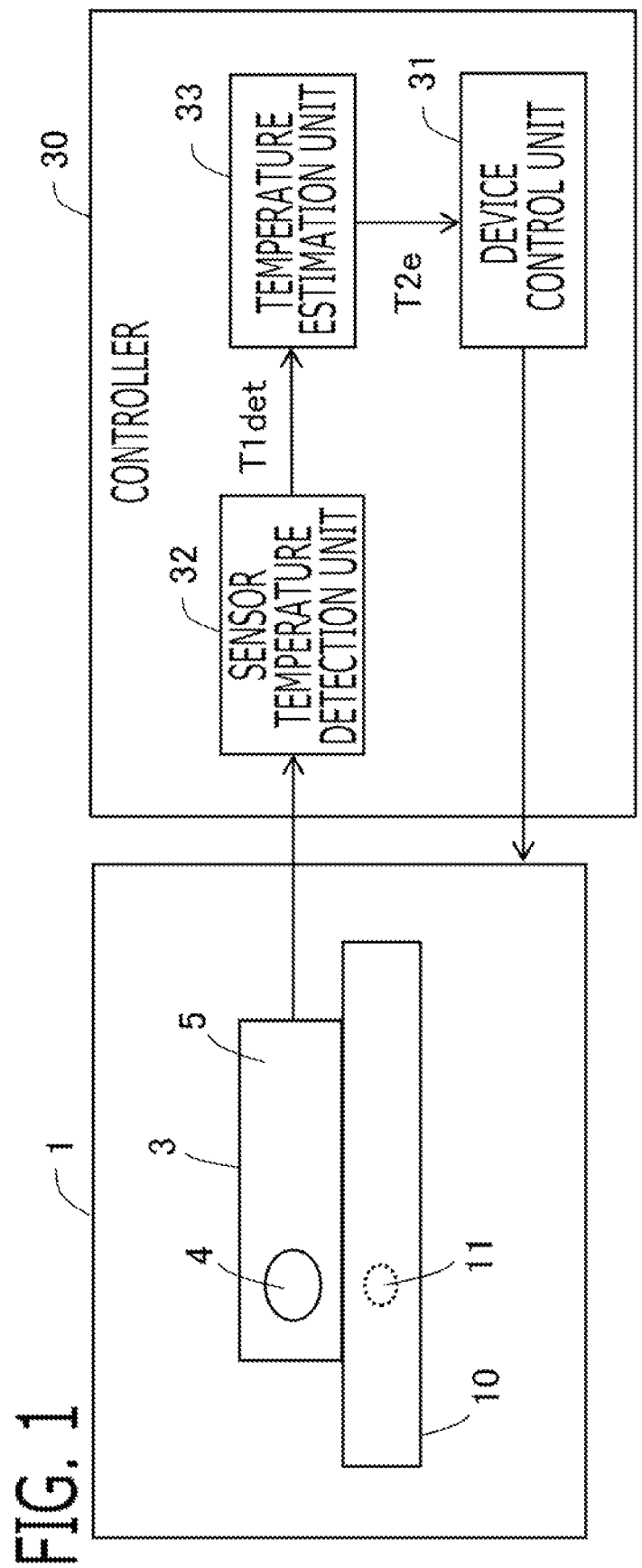
FIG. 1 is a schematic configuration diagram of the temperature estimation object, the temperature sensor, and the controller according to Embodiment 1.

A controller 30 according to Embodiment 1 will be explained with reference to drawings. FIG. 1 is a schematic configuration diagram of a temperature estimation object 10, a temperature sensor 3, a controller 30, and the like.

The temperature sensor 3 is attached to the temperature estimation object 10 provided in a device 1. The temperature sensor 3 is provided with a sensor part 4 and a sensor protecting part 5 which covers and protects around the sensor part 4. A thermistor or the like is used for the sensor part 4. The sensor protecting part 5 is configured by a resin, a metal casing, and the like. The temperature sensor 3 has a heat capacity C. Especially, the heat capacity of the sensor protecting part 5 is so large that it cannot be neglected. The surface of the sensor protecting part 5 is contacted and attached to the surface of the temperature estimation object 10. The temperature of the sensor part 4 changes according to the temperature of the surrounding sensor protecting part 5. The output signal of the temperature sensor 3 is inputted into the controller 30.

The temperature estimation object 10 is provided with an electric circuit. The temperature increases and decreases according to the increase and decrease of the heating amount of the electric circuit. The heating amount of the electric circuit increases and decreases according to power consumption. A coil, a circuit element, a wiring, and the like are used as the electric circuit. The power consumption of the electric circuit is controlled by the controller 30. A temperature estimation point 11 where temperature is estimated by the temperature estimation unit 33 described below is set inside the temperature estimation object 10. For example, the temperature estimation point 11 is set to a point where temperature becomes highest, or a point where overheat protection is required.

1-3. Controller 30

Figure 2:
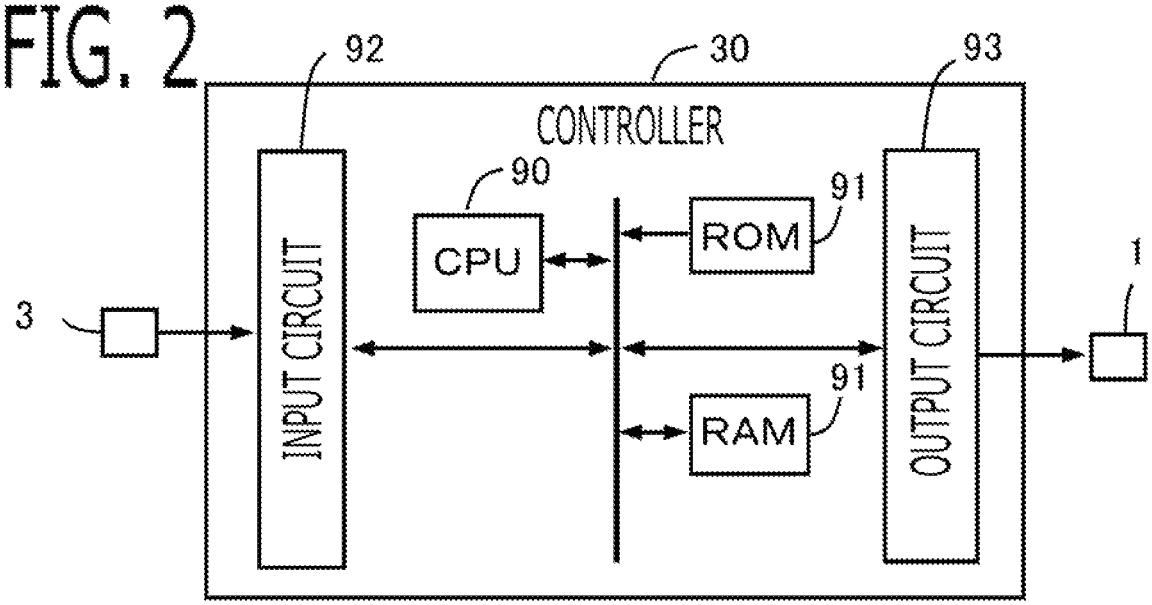
FIG. 2 is a schematic hardware configuration diagram of the controller according to Embodiment 1.

As shown in FIG. 1, the controller 30 is provided with a device control unit 31, a sensor temperature detection unit 32, a temperature estimation unit 33, and the like. Each function of the controller 30 is realized by processing circuits provided in the controller 30. Specifically, as shown in FIG. 2, the controller 30 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatus, such as RAM (Random Access Memory), ROM (Read Only Memory), a flash memory, and EEPROM (Electrically Erasable Programmable Read Only Memory), are used. The input circuit 92 is connected with various kinds of sensors and such as the temperature sensor 3, and is provided with an A/D converter and the like for inputting output signals of these sensors to the arithmetic processor 90. The output circuit 93 is connected with electric loads such as the electric circuit of the temperature estimation object 10, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 33 included in the controller 50 are realized. Setting data items such as the thermal time constant $\tau$, the determination value to be utilized in the control units 31 to 33 are stored, as part of software items (programs), in the storage apparatus 91 such as a ROM. Each function of the controller 30 will be described in detail below.

1-1-1. Device Control Unit 31

The device control unit 31 controls a power consumption of the temperature estimation object 10. In the present embodiment, the device control unit 31 changes an amount of energizing currents to the electric circuit of the temperature estimation object 10. The device control unit 31 suppresses a heat generation of the temperature estimation object 10, based on the estimated temperature T2e of the temperature estimation point estimated by the temperature estimation unit 33. For example, when the estimated temperature T2e of the temperature estimation point exceeds a determination value, the device control unit 31 reduces the power consumption of the temperature estimation object 10 so that the temperature of the temperature estimation point 11 decreases.

1-1-2. Sensor Temperature Detection Unit 32

The sensor temperature detection unit 32 detects a sensor temperature T1, based on the output signal of the temperature sensor 3. For example, the sensor temperature detection unit 32 detects the sensor temperature T1det at every predetermined calculation period.

The sensor temperature detection unit 32 stores the detection value of sensor temperature T1det at each time point to the storage apparatus 91, such as RAM. The temperature estimation unit 33 described below reads the detection value of sensor temperature T1detold detected before the step time ΔT from now from the storage apparatus 91.

1-1-3. Temperature Estimation Unit 33

<Heat Circuit Model>

Figure 3:
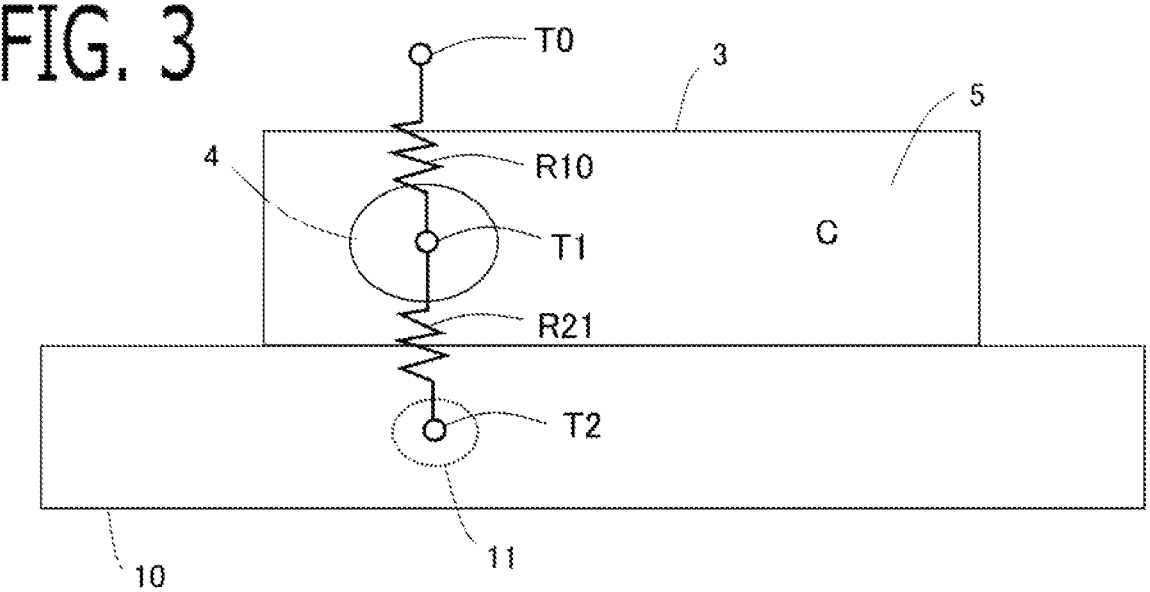
FIG. 3 is a figure for explaining the heat circuit model according to Embodiment 1.

FIG. 3 shows a heat circuit model. Herein, T2 is a temperature of the temperature estimation point 11, T1 is a temperature of the sensor part 4, and T0 is an ambient temperature of the temperature sensor 3. The ambient temperature T0 of the temperature sensor is a temperature of gas, such as air around the temperature sensor 3, or a temperature of liquid refrigerant, such as water or oil around the temperature sensor 3.

R21 is a thermal resistance [K/J×s] between the temperature estimation point 11 and the sensor part 4, and R10 is a thermal resistance [K/J×s] between the sensor part 4 and ambient of the temperature sensor. The thermal resistance is a value representing the difficulty of transmitting temperature, and means a temperature variation amount [K] per a heat flow rate per unit time [J/s].

The heat capacity C of the temperature sensor 3 is a heat capacity [J/K] of the whole member of the temperature sensor 3 formed integrally with the sensor part 4. In this example, it is the heat capacity of the sensor part 4 and the sensor protecting part 5. The heat capacity C of the temperature sensor 3 becomes a value obtained by multiplying the mass m and the specific heat capacity c of the temperature sensor 3.

For example, the temperature estimation point 11 of the temperature estimation object 10 is set to a point where temperature becomes highest, or a point where overheat protection is required, and it becomes a heating source or a point close to the heating source.

<Derivation of Estimation Method in the Case of R21<<R10>

A temperature estimation method in the case where the thermal resistance R10 between the sensor part 4 and the ambient of the temperature sensor is sufficiently larger than the thermal resistance R21 between the temperature estimation point 11 and the sensor part 4 will be explained. For example, the surface of the temperature sensor 3 except the contact part with the temperature estimation object 10 is thermally insulated with ambient gas or fluid. Alternatively, the whole temperature sensor 3 may be surrounded by the temperature estimation object 10, and may be isolated with the ambient gas or fluid.

In this case, the temperature of the sensor part T1 does not change according to the ambient temperature T0 of the temperature sensor, but changes according to the temperature of the temperature estimation point T2. Accordingly, it is not necessary to consider the ambient temperature T0 of the temperature sensor.

It becomes T1≈T2 in steady state. But, in transient state, a time lag occurs in change of the temperature of the sensor part T1 with respect to change of the temperature of the temperature estimation point T2. A time constant τ [s] of a time lag from the temperature of the temperature estimation point T2 to the sensor temperature T1 (hereinafter, referred to as a thermal time constant τ) becomes a multiplication value of the heat capacity C [J/K] of the temperature sensor and the thermal resistance R21 [K/J×s] between the temperature estimation point 11 and the sensor part 4, as shown in the next equation, $$\tau = R21 \times C$$

$$C = m \times c \tag{1}$$

Between the temperature change from the sensor temperature T1old [K] before the step time ΔT to the current sensor temperature T1now [K], and the heat flow rate per unit time Wdt [J/s] which was flowing into the temperature sensor 3 during this step time, the next equation is established using the heat capacity C [J/K] of the temperature sensor 3, and the step time ΔT [s].

$$(T1now - T1old) \times C / \Delta T = Wdt \tag{2}$$

Between a temperature difference between the current temperature of the temperature estimation point T2now [K] and the current sensor temperature T1now [K], and the heat flow rate per unit time Wdt [J/s] which was inputted into the thermal resistance R21, the next equation is established using the thermal resistance R21 [K/J×s].

$$(T2now - T1now) / R21 = Wdt \tag{3}$$

When the equation (1) and the equation (2) are substituted for the equation (3) and rearranged with regard to the current temperature of the temperature estimation point T2now, the next equation is obtained.

$$T2now = T1now + \tau \times (T1now - T1old) / \Delta T \tag{4}$$

As shown in the equation (2) which is the origin of the equation (4), based on a value obtained by dividing the change amount of the sensor temperature (T1now−T1old) during the step time ΔT by the step time ΔT, an equivalent value of the heat flow rate Wdt which is flowing into the temperature sensor 3 from the temperature estimation object 10 can be estimated. In the case of the method for estimating the heating amount using a current value and the like, a temperature estimation error may occur due to an estimated error of the heating amount due to various kinds of variation factors, such as a manufacturing variation, an aging change, and a condition change, and an estimation error of the heating amount due to unexpected heat generation, such as a short circuit. On the other hand, since the equivalent value of the varied heat flow rate Wdt can be estimated by the change amount of the sensor temperature during the step time ΔT, estimation accuracy can be maintained even when a variation of the heating amount due to various kinds of variation factors occurs, or even when an unexpected heat generation, such as a short circuit, occurs.

Then, as shown in the equation (3) which is the origin of the equation (4), based on the estimated equivalent value of the heat flow rate Wdt, the current sensor temperature T1now, and the thermal time constant τ, the current temperature of the temperature estimation point T2now can be inversely calculated and estimated. As shown in the equation (1) which is the origin of the equation (4), since the thermal time constant τ corresponds to a multiplication value of the heat capacity C of the temperature sensor and the thermal resistance R21, the heat capacity C of the equation (2) and the thermal resistance R21 of the equation (3) are considered in the calculation of the equation (4). And, the response delay by the thermal time constant τ is considered in the calculation of the equation (4). In steady state, it becomes (T1now−T1old)=0, and it becomes T2now=T1now. Accordingly, in steady state, it is possible to suppress occurrence of a steady state deviation between the temperature of the temperature estimation point T2now and the actual temperature.

Therefore, even when a variation of the heating amount due to various kinds of variation factors occurs or even when a unexpected heat generation, such as a short circuit, occurs, using the equation (4), based on the change of the sensor temperature (T1detnow−T1detold) during the step time ΔT, and the thermal time constant τ, in transient state and steady state, the estimated temperature T2e of the temperature estimation point can be estimated with good accuracy.

<Configuration of Temperature Estimation Unit 33>

Then, the temperature estimation unit 33 calculates the estimated temperature T2e of the temperature estimation point, based on the current detection value of sensor temperature T1detnow, the detection value of sensor temperature T1detold before the step time ΔT, and the thermal time constant τ from the temperature of the temperature estimation point T2 to the sensor temperature T1.

According to this configuration, by only using the detection value of sensor temperature T1det, based on the detection values of sensor temperature before and after the step time ΔT, and the thermal time constant τ, the temperature of the temperature estimation point T2 can be estimated including a transient response. Since the thermal time constant τ from the temperature of the temperature estimation point T2 to the sensor temperature T1 is considered, even if there is a distance between the temperature estimation point 11 and the temperature sensors 3, temperature can be estimated with good accuracy. Therefore, estimation accuracy can be maintained even if the temperature sensor 3 cannot be arranged close to the temperature estimation point 11. Accordingly, the flexibility of the mounting position of the temperature sensor 3 can be improved.

It is not necessary to estimate the heating amount using information other than the temperature detection value, for example, the current value and the like. Accordingly, a temperature estimation error does not occur due to an estimated error of the heating amount due to various kinds of variation factors, such as a manufacturing variation, an aging change, and a condition change, and an estimation error of the heating amount due to unexpected heat generation, such as a short circuit. Accordingly, even when a variation of the heating amount due to various kinds of variation factors, such as a manufacturing variation, an aging change, and a conditioned change, occurs, or even when a unexpected heat generation, such as a short circuit, occurs, temperature can be estimated with good accuracy, based on the detection value of sensor temperature T1det which appears a variation of the heating amount, and system reliability can be improved.

Since the detection value of sensor temperature is used, it is not necessary to use other information, such as the current value, the number of the input signals to the controller 30 can be reduced, and simplification of the device can be achieved. Since calculation using the detection value of sensor temperature is performed, it is not necessary to perform complicated calculation using plural parameters, such as the current value, and calculation processing load can be reduced.

In the present embodiment, using the next equation corresponding to the equation (4), the temperature estimation unit 33 calculates an estimated temperature T2e of the temperature estimation point, based on the current detection value of sensor temperature T1detnow and the detection value of sensor temperature T1detold before the step time ΔT.

$$T2e = T1detnow + \tau \times (T1detnow - T1detold)/\Delta T \quad (5)$$

As shown in the equation (2) which is the origin of the equation (5), based on a value obtained by dividing the change amount of the sensor temperature (T1detnow−T1detold) during the step time ΔT by the step time ΔT, an equivalent value of the heat flow rate Wdt which is flowing into the temperature sensor 3 from the temperature estimation object 10 can be estimated. Accordingly, as mentioned above, even when a variation of the heating amount due to various kinds of variation factors, such as a manufacturing variation, an aging change, and a conditioned change, occurs, or even when a unexpected heat generation, such as a short circuit, occurs, since the equivalent value of the varied heat flow rate Wdt can be estimated by the change amount of the sensor temperature during the step time ΔT, estimation accuracy can be maintained against a variation of the heating amount.

Then, as shown in the equation (3) which is the origin of the equation (5), based on the estimated equivalent value of the heat flow rate Wdt, the current detection value of sensor temperature T1detnow, and the thermal time constant τ, the estimated temperature T2e of the temperature estimation point can be inversely calculated and estimated. As shown in the equation (1) which is the origin of the equation (5), since the thermal time constant τ corresponds to a multiplication value of the heat capacity C of the temperature sensor and the thermal resistance R21, the heat capacity C of the equation (2) and the thermal resistance R21 of the equation (3) are considered in the calculation of the equation (5). And, the response delay by the thermal time constant τ is considered in the calculation of the equation (5). Specifically, by performing a first order lead processing corresponding to the thermal time constant τ toward the detection value of sensor temperature T1det, the estimated temperature T2e of the temperature estimation point is calculated. In steady state, it becomes (T1detnow−T1detold)=0, and it becomes T2e=T1detnow. Accordingly, in steady state, it is possible to suppress occurrence of a steady state deviation between the estimated temperature T2e of the temperature estimation point and the actual temperature.

Therefore, even when a variation of the heating amount due to various kinds of variation factors occurs or even when a unexpected heat generation, such as a short circuit, occurs, by using the equation (5), the change of the sensor temperature (T1detnow−T1detold) during the step time ΔT, and the thermal time constant τ, in transient state and steady state, the estimated temperature T2e of the temperature estimation point can be estimated with good accuracy.

The step time ΔT may be set to the detection period of sensor temperature, or the calculation period of the estimated temperature T2e. Or, the step time ΔT may be set to a period longer than the detection period of sensor temperature, or a period longer than the calculation period of the estimated temperature T2e.

<Setting of Thermal Time Constant τ>

The thermal time constant τ is set to a value calculated by the equation (1) using the heat capacity C of the temperature sensor, and the thermal resistance R21 between the temperature estimation point 11 and the sensor part 4. According to this configuration, since the heat capacity C of the temperature sensor and the thermal resistance R21 can be obtained comparatively easily based on the specifications of components, the thermal time constant τ can be set without performing experiment of the whole device, and development cost can be reduced.

Alternatively, the thermal time constant τ may be set to a value calculated based on the measurement data during temperature rise. For example, there are cases where one that is difficult to model, such as a contact thermal resistance, is included in the thermal resistance R21, it may be set based on the measurement data. If the heating amount of the temperature estimation object 10 can be changed stepwise, an elapsed time until the detection value of temperature sensor T1det reaches about 63.2% of the final value after the step change is measured, and the measured elapsed time is set to the thermal time constant T. The temperature estimation unit 33 may measure the elapsed time after step change on-line, and set the thermal time constant T. Alternatively, the elapsed time after step change is previously measured by experiment off-line, and the thermal time constant τ may be preliminarily set.

<Overheat Protection>

Although any of the setting of the thermal time constant τ by the equation (1) and the setting of the thermal time constant τ by measurement data may be used, the temperature estimation using the thermal time constant τ is effective when performing the overheat protection of the temperature estimation object 10. Specifically, since the temperature change when the abnormal heat generation by the short circuit and the like occurs is fast, even if power consumption is reduced when the estimated temperature of the temperature estimation point 11 which is estimated with good accuracy exceeds the determination value, the overshoot of temperature of the temperature estimation point occurs. Accordingly, considering the abnormal heat generation, it is inevitable to set the determination value to a temperature quite lower than the heat resistant temperature of the device, and the enlargement of the device is caused.

When the rapid temperature rise by such the abnormal heat generation occurs, the temperature of the temperature sensor 3 rises locally, the detection value of sensor temperature T1det becomes larger than the mean temperature of the whole sensor, and the heat capacity acts small. At this time, since the thermal time constant τ which the temperature estimation unit 33 uses becomes larger than the actual thermal time constant, the estimated temperature T2e becomes larger than the actual value of the temperature T2 of the temperature estimation point 11, as similar to the case of FIG. 5 of Embodiment 2 described below. Accordingly, when the temperature change is large, the estimated temperature T2e exceeds the determination value before the actual value of the temperature T2 of the temperature estimation point 11 exceeds the determination value, and the power consumption can be reduced. Accordingly, even if the determination value is set to a temperature corresponding to the heat resistant temperature of the device, the overshoot of temperature can be suppressed and the reliability of the device can be maintained. Accordingly, the enlargement of the device can be suppressed.

In the case of the comparatively slow temperature change which is normally expected, since the thermal time constant τ which the temperature estimation unit 33 uses coincides with the actual response time constant, the estimation accuracy is maintained. In the case of this comparatively slow temperature change, even after the reduction of power consumption, the overshoot amount of temperature does not become large. Accordingly, even if the determination value is set to the temperature corresponding to the heat resistant temperature of the device, the reliability of the device can be maintained and the enlargement of the device can be suppressed.

As described above, according to the temperature estimation using the thermal time constant τ, by utilizing the physical phenomenon that the actual thermal time constant becomes smaller than the thermal time constant τ which the temperature estimation unit 33 uses at the abnormal heat generation, the determination value can be set to the temperature corresponding to the heat resistant temperature of the device, even considering both of the abnormal heat generation and the normal heat generation. The reliability of the device can be maintained and the enlargement of the device can be suppressed.

<Setting of Large Thermal Time Constant τ>

A value larger than either one of the value of the thermal time constant calculated by the equation (1) and the value of the thermal time constant calculated based on the measurement data during temperature rise may be set to the thermal time constant τ. If the thermal time constant τ which the temperature estimation unit 33 uses is made larger than the actual thermal time constant, the phase is advanced, and even at the normal heat generation, the estimated temperature T2e becomes larger than the actual value of the temperature T2 of the temperature estimation point 11. Accordingly, the power consumption can be reduced in the early stage, and the reliability of the device can be further improved.

As a design item that adjusts a temperature margin of the device, a value obtained by multiplying a coefficient of about 0.5 to 2 to the thermal time constant calculated by the equation (1) or the measurement data may be set as the thermal time constant τ. If the heat capacity C has temperature dependency and the like, and the thermal time constant changes according to operating state, such as temperature, the temperature estimation unit 33 may change the thermal time constant τ according to operating state, such as the estimated temperature T2e.

<Control Method>

Figure 4:
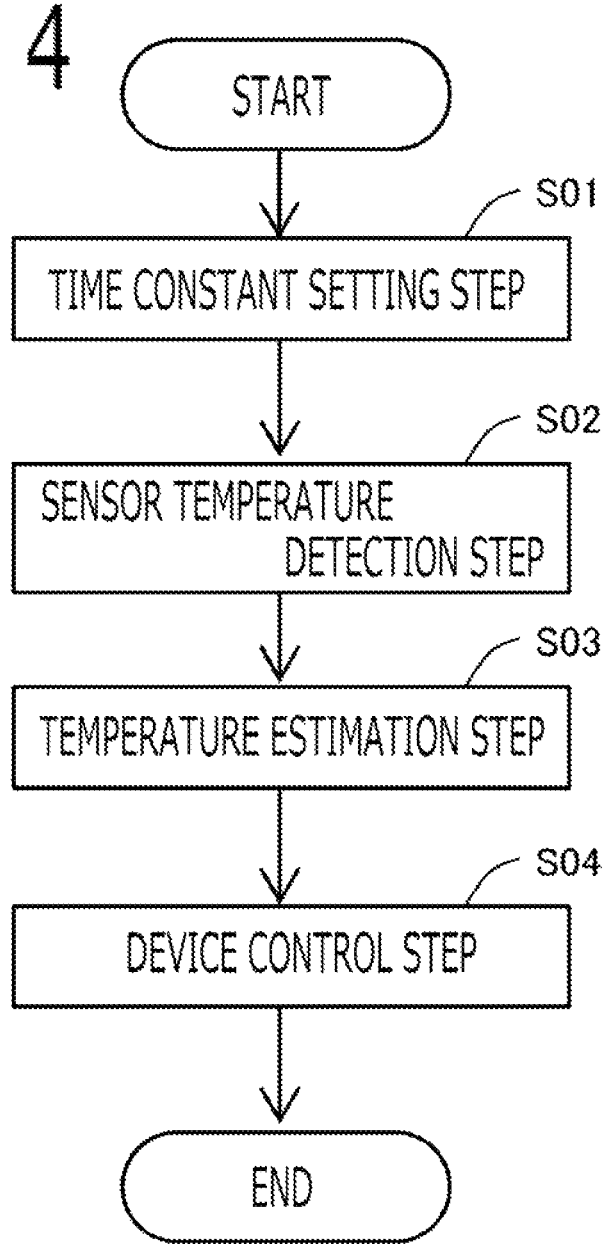
FIG. 4 is a flowchart for explaining the control method according to Embodiment 1.

FIG. 4 shows the flowchart according to the control method of the present embodiment. In the step S01, as mentioned above, a time constant setting step that sets the thermal time constant τ to a value calculated by the equation (1) is performed. The time constant setting step may be performed by the temperature estimation unit 33, or may be previously performed by the designer.

Alternatively, in the step S01, as mentioned above, a time constant setting step that sets the thermal time constant τ to a value calculated based on the measurement data during temperature rise may be performed. The time constant setting step may be performed by the temperature estimation unit 33, or may be previously performed by the designer.

In the step S02, as mentioned above, the sensor temperature detection unit 32 performs a sensor temperature detection step that detects the sensor temperature T1 based on the output signal of the temperature sensor 3.

In the step S03, as mentioned above, the temperature estimation unit 33 performs a temperature estimation step that calculates the estimated temperature T2e of the temperature estimation point, based on the current detection value of sensor temperature T1detnow, the detection value of sensor temperature T1detold before the step time ΔT, and the thermal time constant τ from the temperature of the temperature estimation point T2 to the sensor temperature T1. In the present embodiment, the temperature estimation unit 33 calculates the estimated temperature of the temperature estimation point T2e, based on the current detection value of sensor temperature T1detnow and the detection value of sensor temperature T1detold before the step time ΔT, using the equation (5).

In the step S04, as mentioned above, the device control unit 31 performs a device control step that controls the power consumption of the temperature estimation object 10. The device control unit 31 suppresses the heat generation of the temperature estimation object 10, based on the estimated temperature T2e of the temperature estimation point estimated by the temperature estimation unit 33.

The step S02 to the step S04 are repeatedly executed at every calculation period. On the other hand, the step S01 is executed at every calculation period, or at design stage, or at temperature rise.

2. Embodiment 2

The controller 30 according to Embodiment 2 will be explained. The explanation for constituent parts the same as those in Embodiment 1 will be omitted. The basic configuration of the controller 30 according to the present embodiment is the same as that of Embodiment 1. Embodiment 2 is different from Embodiment 1 in the temperature estimation method.

<Derivation of Estimation Method in the Case where R10 Cannot be Ignored>

A temperature estimation method in the case where the thermal resistance R10 between the sensor part 4 and the ambient of the temperature sensor is not sufficiently larger than the thermal resistance R21 between the temperature estimation point 11 and the sensor part 4 unlike Embodiment 1 and cannot be ignored will be explained. For example, the surface of the temperature sensor 3 is not thermally insulated with ambient gas or fluid, and heat transfer between and the temperature sensor 3 and the ambient of the temperature sensor cannot be ignored.

In this case, the sensor temperature T1 changes according to the ambient temperature T0 of the temperature sensor and the temperature of the temperature estimation point T2. Accordingly, it is necessary to consider the ambient temperature T0 of the temperature sensor.

In this case, since it becomes T1≠T2 even in steady state, error occurs with the estimation method using the equation (4) or the equation (5) of Embodiment 1. Then, as equations are derived in the following, instead of the detection value of sensor temperature T1det in the equation (4) or the equation (5), a correction value of sensor temperature T1cr is used.

In steady state, the heat flow rate from the temperature estimation object 10 to the temperature sensor 3 and the heat flow rate from the temperature sensor 3 to the ambient of temperature sensor become constant values. Accordingly, as shown in the next equation, the heat flow rate Wdt [J/s] obtained by dividing the temperature difference between the current temperature of the temperature estimation point T2now [K] and the current sensor temperature T1now [K] by the thermal resistance R21 [K/J×s] between the temperature estimation point 11 and the sensor part 4 becomes equal to the heat flow rate Wdt [J/s] obtained by dividing the temperature difference between the current sensor temperature T1now [K] and the current ambient temperature T0 of the temperature sensor now [K] by the thermal resistance R10 [K/J×s] between the sensor part 4 and the ambient of temperature sensor.

$$(T2\text{now}-T1\text{now})/R21=(T1\text{now}-T0\text{now})/R10=Wdt \quad (6)$$

When the equation (6) is rearranged with regard to the current temperature of the temperature estimation point T2now, the next equation is obtained.

$$T2\text{now}=T1\text{now}+(T1\text{now}-T0\text{now})\times R21/R10=T1\text{crnow} \quad (7)$$

Accordingly, by using the equation (7), the temperature of the temperature estimation point T2 in steady state can be estimated based on the sensor temperature T1. Since this temperature of the temperature estimation point T2 in steady state can be interpreted as a temperature obtained by proportionally converting the sensor temperature T1 into an equivalent value of the temperature of the temperature estimation point T2, it is referred to as a correction value of sensor temperature T1cr. That is, similar to the equation (4) and the equation (5), the correction value of sensor temperature T1cr so as to become T2=T1cr in steady state is calculated. On the other hand, in transient state, from the actual temperature of the temperature estimation point to the temperature of the temperature estimation point T2 in steady state, the response delay corresponding to the thermal time constant τ from the temperature of the temperature estimation point T2 to the sensor temperature T1 exists.

Accordingly, instead of the sensor temperature T1 of the equation (4), using the next equation which uses the correction value of sensor temperature T1cr, the temperature of the temperature estimation point T2 in steady state and transient state can be estimated. Herein, T1crnow is the current correction value of sensor temperature, and T1crold is the correction value of sensor temperature before the step time ΔT.

$$T2\text{now}=T1\text{crnow}+\tau\times(T1\text{crnow}-T1\text{crold})/\Delta T$$

$$T1\text{crnow}=T1\text{now}+(T1\text{now}-T0\text{now})\times R21/R10 \quad (8)$$

According to the equation (8), even if the thermal resistance R10 cannot be ignored with respect to the thermal resistance R21 and it becomes T1≠T2 in steady state, using the correction value of sensor temperature T1cr obtained by converting the sensor temperature T1 into the equivalent value of the temperature of the temperature estimation point T2 in steady state using a ratio of the thermal resistance R21 with respect to the thermal resistance R10, the temperature of the temperature estimation point T2 can be estimated. Accordingly, it becomes T2=T1cr in steady state, and the estimation accuracy in steady state can be improved. And, since the thermal time constant τ is used similar to the equation (4), the response delay due to the heat capacity C and the thermal resistance R21 can be simulated.

<Configuration of Temperature Estimation Unit 33>

Then, in the present embodiment, the temperature estimation unit 33 calculates the estimated temperature of the temperature estimation point T2e, based on the current correction value of sensor temperature T1crnow calculated based on the current detection value of sensor temperature T1detnow, the correction value of sensor temperature T1crold before the step time ΔT, and the thermal time constant τ from the temperature of the temperature estimation point T2 to the sensor temperature T1.

According to this configuration, even if the heat transfer between the temperature sensor 3 and the ambient of the temperature sensor cannot be ignored. By only using the correction value of sensor temperature T1cr calculated based on the detection value of sensor temperature T1det, steady and transient response of the temperature of the temperature estimation point T2 can be estimated by the correction values of sensor temperature T1crnow, T1crold before and after the step time ΔT, and the thermal time constant τ. Since the thermal time constant τ from the temperature of the temperature estimation point T2 to the sensor temperature T1 is considered, even if there is a distance between the temperature estimation point 11 and the temperature sensors 3, temperature can be estimated with good accuracy. Therefore, estimation accuracy can be maintained even if the temperature sensor 3 cannot be arranged close to the temperature estimation point 11. Accordingly, the mounting position of the temperature sensor 3 is not limited by the heat transfer degree from the temperature sensor 3 to the ambient, and the distance between the temperature estimation point 11 and the temperature sensors 3. Flexibility of the mounting position can be improved.

Similar to Embodiment 1, since it is not necessary to estimate the heating amount using information other than the detection value of sensor temperature, for example, the current value and the like, a temperature estimation error does not occur due to an estimated error of the heating amount due to various kinds of variation factors, such as a manufacturing variation, an aging change, and a condition change, and an estimation error of the heating amount due to unexpected heat generation, such as a short circuit. Accordingly, even when a variation of the heating amount due to various kinds of variation factors, such as a manufacturing variation, an aging change, and a conditioned change, occurs, or even when a unexpected heat generation, such as a short circuit, occurs, temperature can be estimated with good accuracy, based on the detection value of sensor temperature T1det which appears a variation of the heating amount, and system reliability can be improved.

Since the detection value of sensor temperature is used, it is not necessary to use other information, such as the current value, the number of the input signals to the controller 30 can be reduced, and simplification of the device can be achieved. Since calculation using the detection value of sensor temperature is performed, it is not necessary to perform complicated calculation using plural parameters, such as the current value, and calculation processing load can be reduced.

In the present embodiment, using the next equation corresponding to the equation (8), the temperature estimation unit 33 calculates the estimated temperature of the temperature estimation point T2e, based on the current correction value of sensor temperature T1crnow and the correction value of sensor temperature T1crold before the step time ΔT.

$$T2e = T1crnow + \tau \times (T1crnow - T1crold)/\Delta T \quad (9)$$

According to the equation (9), in steady state, it becomes (T1crnow−T1crold)=0, and it becomes T2e=T1crnow. Accordingly, in steady state, it is possible to suppress occurrence of a steady state deviation between the estimated temperature T2e of the temperature estimation point and the actual temperature. The response delay due to the thermal time constant τ is considered in the calculation of the equation (9). Specifically, by performing a first order lead processing corresponding to the thermal time constant τ toward the correction value of sensor temperature T1cr, the estimated temperature T2e of the temperature estimation point is calculated.

Therefore, even when a variation of the heating amount due to various kinds of variation factors occurs or even when a unexpected heat generation, such as a short circuit, occurs, by the change of the correction value of sensor temperature (T1crnow−T1crold) during the step time ΔT, and the thermal time constant τ, in transient state and steady state, the estimated temperature T2e of the temperature estimation point can be estimated with good accuracy.

The temperature estimation unit 33 calculates the current correction value of sensor temperature T1crnow, based on the current detection value of sensor temperature T1detnow, using the next equation.

$$T1crnow = T1detnow + (T1detnow - T0) \times \alpha \quad (10)$$

The temperature estimation unit 33 stores the correction values of sensor temperature T1crnow calculated at each time point to the storage apparatus 91, such as RAM. Then, the temperature estimation unit 33 reads the correction value of sensor temperature T1crold calculated before the step time ΔT from now from the storage apparatus 91.

The ambient temperature T0 of the temperature sensor is preliminarily set to a predetermined temperature. For example, the ambient temperature T0 may be set to a temperature in a standard state (for example, 25° C.) of the ambient gas or fluid. If the refrigerant of fluid exists in the ambient, the ambient temperature T0 may be set to a rated temperature of a cooling mechanism. Alternatively, the ambient temperature T0 may be set to a temperature detected by a temperature sensor which measures a temperature of the ambient gas or fluid.

In the equation (10), α is a coefficient. The coefficient α is set to a value calculated by the next equation based on the thermal resistance R10 between the sensor part 4 and the ambient of temperature sensor, and the thermal resistance R21 between the temperature estimation point 11 and the sensor part 4.

$$\alpha = R21/R10 \quad (11)$$

Alternatively, the coefficient α may be set to a value calculated based on the ambient temperature T0st of the temperature sensor in steady state, the sensor temperature T1st in steady state, and the temperature of the temperature estimation point T2st in steady state, using the next equation which modified the equation (6). Each temperature in steady state is obtained by experiment.

$$\alpha = (T2st - T1st)/(T1st - T0st) \quad (12)$$

<Setting of Thermal Time Constant τ>

Similar to Embodiment 1, the thermal time constant τ is set to a value calculated by the equation (1) using the heat capacity C of the temperature sensor, and the thermal resistance R21 between the temperature estimation point 11 and the sensor part 4. Alternatively, the thermal time constant τ may be set to a value calculated based on the measurement data during temperature rise.

<Overheat Protection>

Similar to Embodiment 1, according to the temperature estimation using the thermal time constant τ, by utilizing the physical phenomenon that the actual thermal time constant becomes smaller than the thermal time constant τ which the temperature estimation unit 33 uses at the abnormal heat generation such as the short circuit, the determination value can be set to the temperature corresponding to the heat resistant temperature of the device, even considering both of the abnormal heat generation and the normal heat generation, the reliability of the device can be maintained and the enlargement of the device can be suppressed.

<Setting of Large Thermal Time Constant τ>

Similar to Embodiment 1, a value larger than either one of the value of the thermal time constant calculated by the equation (1) and the value of the thermal time constant calculated based on the measurement data during temperature rise may be set to the thermal time constant τ. And, as a design item that adjusts a temperature margin of the device, a value obtained by multiplying a coefficient of about 0.5 to 2 to the thermal time constant calculated by the equation (1) or the measurement data may be set as the thermal time constant τ. If the heat capacity C has temperature dependency and the like, and the thermal time constant changes according to operating state, such as temperature, the temperature estimation unit 33 may change the thermal time constant τ according to operating state.

<Estimate Behavior>

Figure 5:
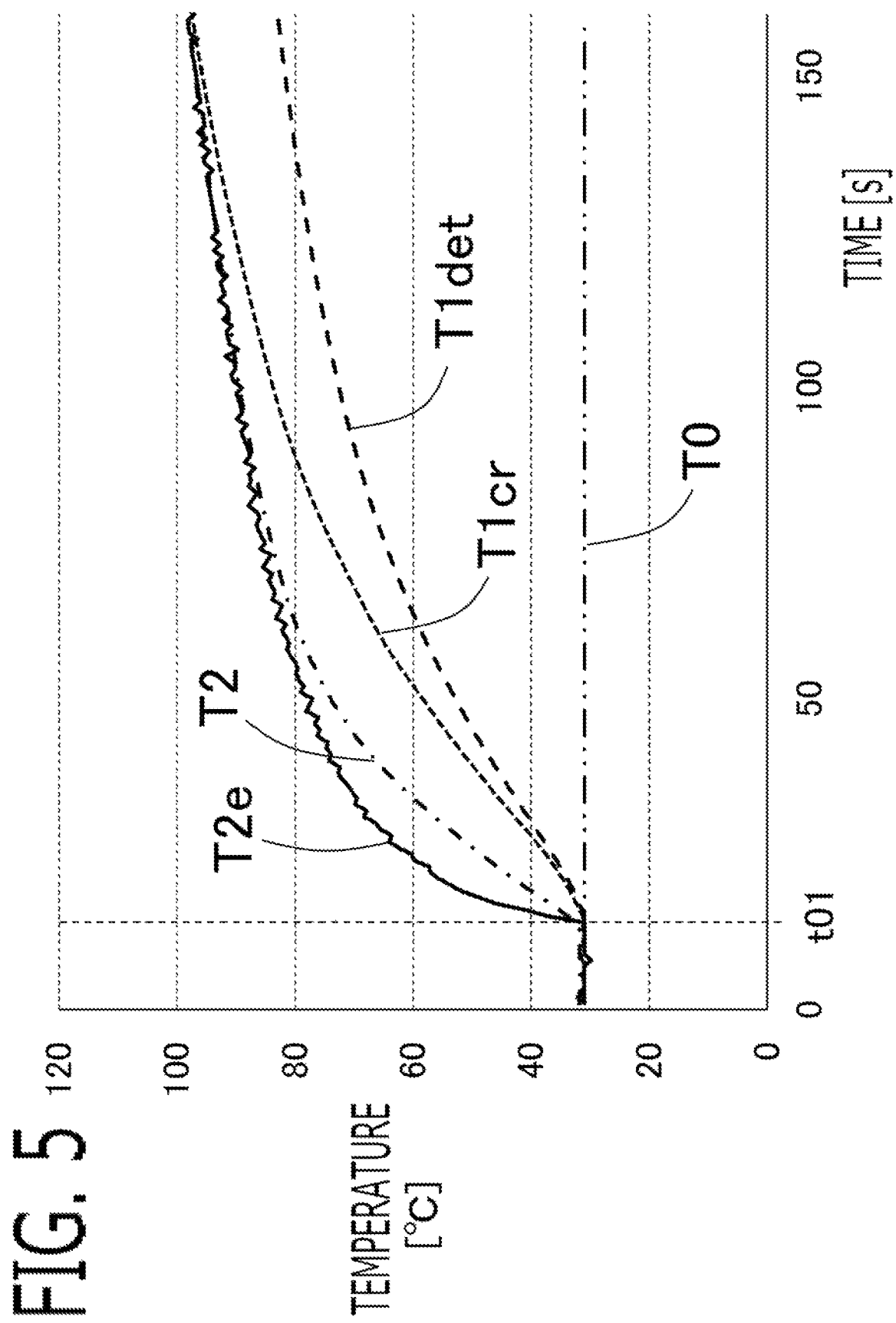
FIG. 5 is a time chart for explaining the temperature estimation behavior according to Embodiment 2.

FIG. 5 shows an example of the estimation behavior of temperature. A temperature sensor is attached at the temperature estimation point 11 for experiment, the actual value of the temperature of the temperature estimation point T2 is detected. Until the time t01, it becomes steady state in the condition where the temperature estimation object 10 is not heating, and the detection value of sensor temperature T1det and the actual value of the temperature of the temperature estimation point T2 coincide with the actual value of the ambient temperature T0 of the temperature sensor. At this time, the deviation between the detection value of sensor temperature T1det and the ambient temperature T0 of the temperature sensor becomes 0 by the equation (10), and the correction value of sensor temperature T1cr coincides with the detection value of sensor temperature T1det. Accordingly, the estimated temperature of the temperature estimation point T2e coincides with the detection value of sensor temperature T1det by the equation (9), and the temperature can be estimated with good accuracy.

At the time t01, the heating amount of the temperature estimation object 10 is increased stepwise. After the time t01, the actual value of the temperature of the temperature estimation point T2 is increasing with delay. Then, the detection value of sensor temperature T1det is increasing with delay of the thermal time constant, with respect to the actual value of the temperature of the temperature estimation point T2.

When the detection value of sensor temperature T1det is increasing from the ambient temperature T0 of the temperature sensor, by the equation (10), the correction value of sensor temperature T1cr is increasing from the detection value of sensor temperature T1det by an increase amount according to the deviation between the detection value of sensor temperature T1det and the ambient temperature T0. Since the estimated temperature of the temperature estimation point T2e is calculated by performing the first order lead processing corresponding to the thermal time constant τ toward the correction value of sensor temperature T1cr, it becomes close to the actual value of the temperature of the temperature estimation point T2. In the example of FIG. 5, due to the rapid temperature rise or the setting of the large thermal time constant τ, the thermal time constant τ becomes larger than the actual thermal time constant. Accordingly, the phase of the estimated temperature of the temperature estimation point T2e advances more than the phase of the actual value of the temperature of the temperature estimation point T2, and the estimated temperature of the temperature estimation point T2e becomes larger than the actual value of the temperature of the temperature estimation point T2. Accordingly, the temperature rise of the temperature estimation point can be detected in the early stage, and the overheat protection can be performed in the early stage. If the thermal time constant τ is coincided with the actual thermal time constant, the estimated temperature T2e can be adjusted with the actual value.

On the other hand, when the actual value of the temperature of the temperature estimation point T2 approaches a steady state, as explained using the equation (6) and the equation (7), the correction value of sensor temperature T1cr in which the heat flow rate in steady state is considered coincides with the actual value of the temperature of the temperature estimation point T2. Accordingly, the estimated temperature of the temperature estimation point T2e which coincides with the correction value of sensor temperature T1cr in steady state coincides with the actual value of the temperature of the temperature estimation point T2. Therefore, even if the heat transfer between the temperature sensor 3 and the ambient of temperature sensor cannot be ignored and it becomes T1det≠T2 in steady state, the temperature of the temperature estimation point in steady state can be estimated with good accuracy, based on the detection value of sensor temperature T1det.

<Control Method>

Figure 6:
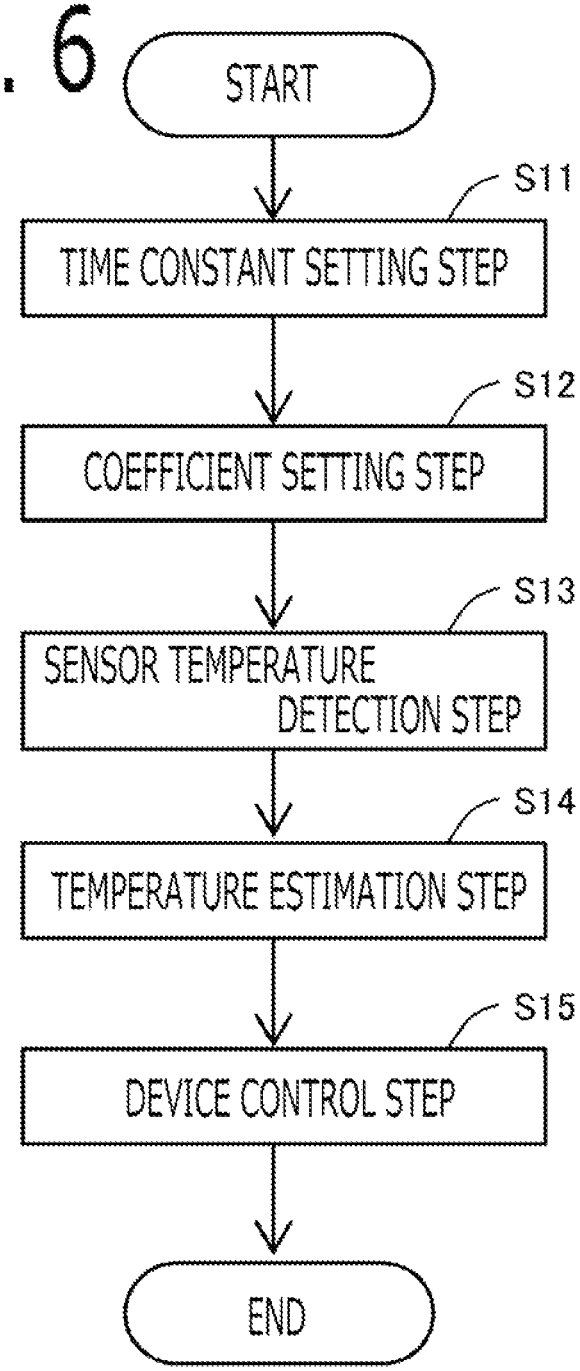
FIG. 6 is a flowchart for explaining the control method according to Embodiment 2.

FIG. 6 shows the flowchart according to the control method of the present embodiment. In the step S11, as mentioned above, a time constant setting step that sets the thermal time constant τ to a value calculated by the equation (1) is performed. The time constant setting step may be performed by the temperature estimation unit 33, or may be previously performed by the designer.

Alternatively, in the step S11, as mentioned above, a time constant setting step that sets the thermal time constant τ to a value calculated based on the measurement data during temperature rise may be performed. The time constant setting step may be performed by the temperature estimation unit 33, or may be previously performed by the designer.

In the step S12, as mentioned above, a coefficient setting step that sets the coefficient α to a value calculated by the equation (11) is performed. The coefficient setting step may be performed by the temperature estimation unit 33, or may be previously performed by the designer.

Alternatively, in the step S12, as mentioned above, a coefficient setting step that sets the coefficient α to a value calculated based on the ambient temperature T0st of the temperature sensor in steady state, the sensor temperature T1st in steady state, and the temperature of the temperature estimation point T2st in steady state, using the equation (12) may be performed. The coefficient setting step may be performed by the temperature estimation unit 33, or may be previously performed by the designer.

In the step S13, as mentioned above, the sensor temperature detection unit 32 performs a sensor temperature detection step that detects the sensor temperature T1 based on the output signal of the temperature sensor 3.

In the step S14, as mentioned above, the temperature estimation unit 33 performs a temperature estimation step that calculates the estimated temperature of the temperature estimation point T2e, based on the current correction value of sensor temperature T1crnow calculated based on the current detection value of sensor temperature T1detnow, the correction value of sensor temperature T1crold before the step time ΔT, and the thermal time constant τ from the temperature of the temperature estimation point T2 to the sensor temperature T1. In the present embodiment, the temperature estimation unit 33 calculates the estimated temperature of the temperature estimation point T2e, based on the current correction value of sensor temperature T1crnow and the correction value of sensor temperature T1crold before the step time ΔT, using the equation (9). The temperature estimation unit 33 calculates the current correction value of sensor temperature T1crnow, based on the current detection value of sensor temperature T1detnow, using the equation (10).

In the step S15, as mentioned above, the device control unit 31 performs a device control step that controls the power consumption of the temperature estimation object 10. The device control unit 31 suppresses the heat generation of the temperature estimation object 10, based on the estimated temperature T2e of the temperature estimation point estimated by the temperature estimation unit 33.

The step S13 to the step S15 are repeatedly executed at every calculation period. On the other hand, the step S11 and the step S12 are executed at every calculation period, or at design stage, or at temperature rise.

3. Embodiment 3

Figure 7:
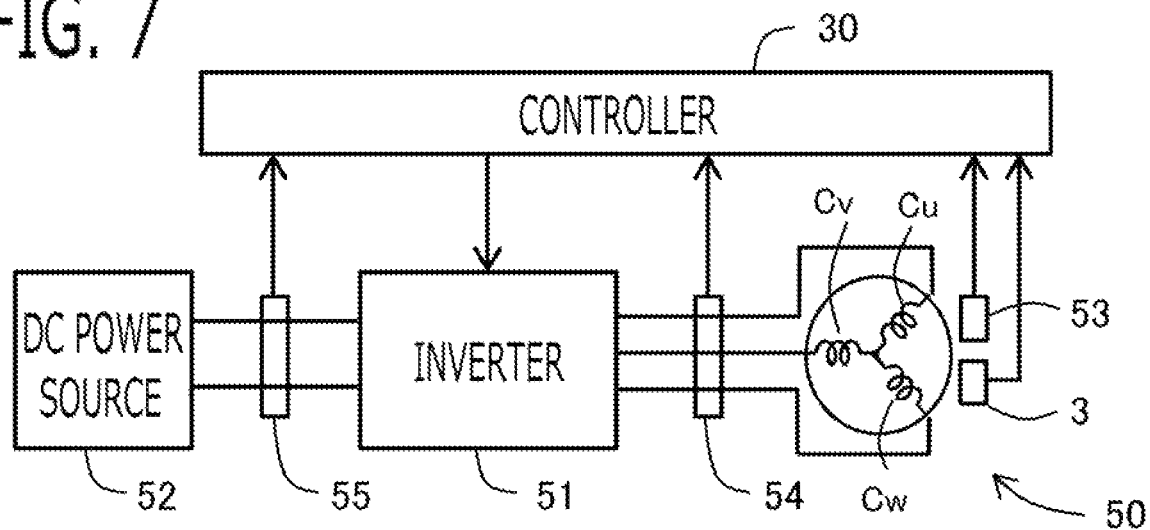
FIG. 7 is a schematic configuration diagram of the rotary electric machine, the inverter, and the controller according to Embodiment 3.

The controller 30 according to Embodiment 3 will be explained. The explanation for constituent parts the same as those in Embodiment 1 or 2 will be omitted. The basic configuration of the controller 30 according to the present embodiment is the same as that of Embodiment 1 or 2. Embodiment 3 is different from Embodiment 1 or 2 in that the controller 30 controls a rotary electric machine and the temperature estimation object 10 is the rotary electric machine. FIG. 7 is a schematic configuration diagram of a rotary electric machine 50, an inverter 51, the controller 30, and the like.

3-1. Rotary Electric Machine 50

Figure 8:
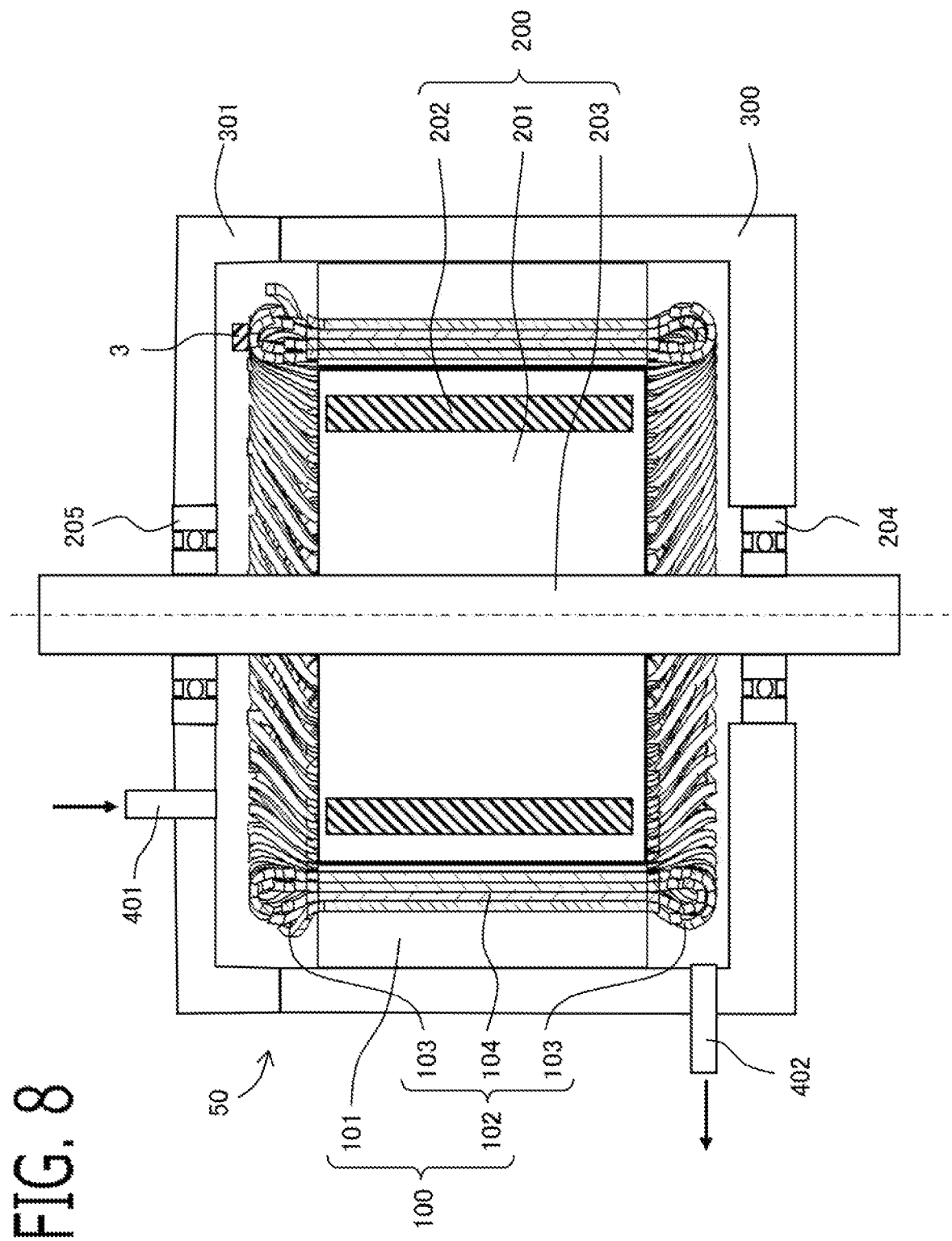
FIG. 8 is a schematic cross-sectional view of the rotary electric machine according to Embodiment 3.

FIG. 8 shows a cross-sectional view of the rotary electric machine 50 cuts at a plane passing a rotation axial center. The rotary electric machine 50 is provided with a cylindrical tubular stator 100, and a cylindrical tubular rotor 200 which is disposed at the radial-direction inner side of the stator 100 and is rotatably supported by the bearings 204, 205. In the present embodiment, the rotary electric machine 50 is a permanent-magnet type synchronous motor, the coil 102 is wound around the stator 100, and the permanent magnet 202 is provided in the rotor 200. The rotary electric machine 50 is an oil cooling type.

The stator 100 is provided with a stator core 101 in which annular-disk electromagnetic steel plates are laminated in the axial direction, and coil 102 wound around each teeth of the stator core 101. Plural teeth are provided in the circumferential direction at the equivalent interval. The coil 102 is provided with a coil part 104 (in-core coil part 104) arranged within the stator core 101 (within the slot), and a coil end part 103 projected on both sides in the axial direction from the stator core 101. The coils of plural phases are provided as the coil 102 (in this example, the coils Cu, Cv, Cw of the three-phase of U phase, V phase, and W phase), and the end of the coil of each phase is connected to the inverter 51. Plural pairs of the coils of three-phase (for example, two pairs) may be provided.

The temperature estimation object 10 is the coil 102, and the temperature sensor 3 is attached to the coil 102. In the present embodiment, the temperature sensor 3 is attached to the coil end part 103 of the axial direction one side. The temperature sensor 3 may be attached to a part of the coil 102 other than the coil end part 103.

The rotor 200 is provided with a rotor core 201 in which annular-disc electromagnetic steel plates are laminated in the axial direction, permanent magnets 202 equipped in each slot of the rotor core 201, and the rotation axis 203 fixed to the inner circumferential face of the rotor core 201. The permanent magnet 202 may be fixed to the outer circumferential face of the rotor core 201. The rotation axis 203 is provided with a rotation sensor 53 (unillustrated in FIG. 8) for detecting a rotational angle of the rotor 200. Resolver, encoder, or MR sensor is used for the rotation sensor 53. An output signal of the rotation sensor 53 is inputted into the controller 30.

The stator 100 and the rotor 200 are housed within a housing, and are sealed in a liquid-tight state. As the housing, a bottomed cylindrical tubular first housing 300 with deep bottom, and a bottomed cylindrical tubular second housing 301 with shallow bottom which closes the opening of the first housing 300 are provided. The stator 100 (the stator core 101) is fixed to the inner circumferential face of the circumferential wall of the first housing 300. Each of the bottom wall of the first housing 300 and the bottom wall of the second housing 301 is provided with a through hole which a rotation axis 203 penetrates. The inner circumferential face of the through hole of the bottom wall of the first housing 300 rotatably supports the axial direction one side of the rotation axis 203 via the first bearing 204. The inner circumferential face of the through hole of the bottom wall of the second housing 301 rotatably supports the other side of the axial direction of the rotation axis 203 via the second bearing 205. Each of the first bearing 204 and the second bearing 205 is a bearing with seal, and has a structure where the cooling oil within the housing is not leaked outside.

The housing is provided with a refrigerant supply hole 401 which supplies the cooling oil supplied from an external refrigerant circulation cooling apparatus into the housing, and a refrigerant discharge hole 402 which discharges the cooling oil in the housing to the refrigerant circulation cooling apparatus. The cooling oil supplied into the housing is discharged from the housing, after cooling each part of the stator 100 and the rotor 200. The refrigerant circulation cooling apparatus cools the refrigerant (in this example, cooling oil) which cools the rotary electric machine 50 by the radiator and the like and circulates.

The cooling oil is stirred by rotation of the rotor 200 and supplied to each part of the stator 100 and the rotor 200. The cooling oil is supplied also to the ambient of the temperature sensor 3, and the ambient temperature T0 of the temperature sensor becomes the temperature of the cooling oil. Accordingly, the ambient temperature T0 of the temperature sensor may be set to the rated temperature of the refrigerant circulation cooling apparatus, and it may be set to a temperature detected by a temperature sensor provided in the refrigerant circulation cooling apparatus. Alternatively, in the case of an air cooling type, the ambient temperature T0 of the temperature sensor 3 becomes a temperature of air.

3-2. Inverter 51

Figure 9:
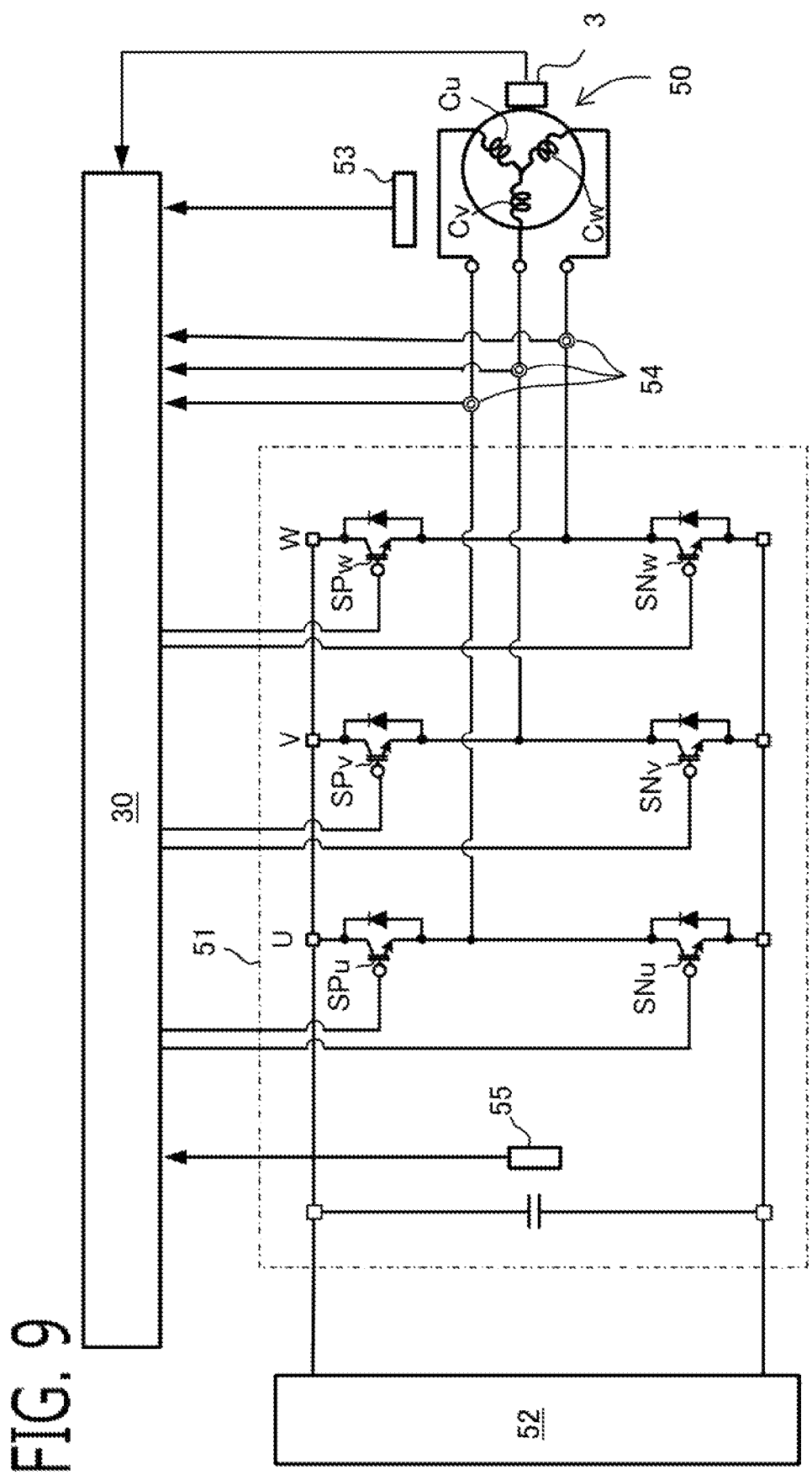
FIG. 9 is a schematic circuit diagram of the inverter according to Embodiment 3.

As shown in FIG. 9, the inverter 51 is provided with three sets of a series circuit (leg) where a positive electrode side switching device SP connected to a positive electrode side of the DC power source 52 and a negative electrode side switching device SN connected to a negative electrode side of the DC power source 52 are connected in series, corresponding to respective phase of three-phase. A connection node of two switching devices in each phase series circuit is connected to the coil of the corresponding phase.

FET (Field Effect Transistor) in which a diode is connected in reversely parallel, IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 30 via a gate drive circuit and the like. The each switching device is turned on or turned off by the switching signal outputted from the controller 30.

The DC power source 52 outputs a DC voltage Vdc to the inverter 51. The DC power source 52 may be any apparatus which outputs DC voltage, such as a battery, a DC-DC converter, a diode rectifier, and a PWM rectifier. A voltage sensor 55 which detects the DC voltage Vdc of the DC power source 52 is provided in the DC power source 52. An output signal of the voltage sensor 55 is inputted into the controller 30.

A current sensor 54 which detects current which flows into the coil of each phase is provided. The current sensor 54 is provided on a wire which connects the series circuit of two switching devices of each phase, and the coil of each phase. An output signal of the current sensor 54 is inputted into the controller 30. The current sensor 54 may be provided in the series circuit of two switching devices of each phase.

3-3. Controller 30

In the present embodiment, the device control unit 31 controls the rotary electric machine 50 via the inverter 51. The input circuit 92 is connected to the rotation sensor 53, the current sensor 54, the voltage sensor 55, the temperature sensor 3, and the like. And, the output signals of these sensors are A/D converted and inputted into the arithmetic processor 90. The output circuit 93 is connected to electric loads, such as a gate drive circuit which drives on/off of the switching devices.

The device control unit 31 controls applied voltages applied to the three-phase coils of the rotary electric machine 50 based on the detection signal of each sensor, and controls a torque of the rotary electric machine 50. For example, the device control unit 31 calculates current command values based on a torque command value, a rotational speed detected by the rotation sensor 53, and the DC voltage Vdc detected by the voltage sensor 55. The device control unit 31 changes voltage command values so that current detection values detected by the current sensor 54 approach the current command values. The device control unit 31 drives on/off of the switching devices based on the voltage command values, and applies voltages to the three-phase coils.

The device control unit 31 suppresses the heat generation of the coil, based on the estimated temperature T2e of the temperature estimation point estimated by the temperature estimation unit 33. For example, when the estimated temperature of the temperature estimation point T2e exceeds the determination value, the device control unit 31 reduces the output torque of the rotary electric machine 50, and reduces the power consumption.

The coil is insulated by resin and the like, and it is necessary to suppress overheating in order to secure the insulation. Then, in the present embodiment, the temperature estimation point 11 is set to a point of the coil where temperature becomes highest, or a point of the coil where overheat protection is required. The point where the overheat protection is required is set to a point of the coil where especially temperature rises easily and be hardly cooled. For example, the temperature estimation point is set to the in-core coil part 104 (for example, central part in the axial direction) which is arranged within the stator core. It is not easy to directly attach the temperature sensor 3 to the in-core coil part 104 arranged within the stator core. Accordingly, the temperature sensor 3 is attached to the coil end part 103 which is distant from the in-core coil part 104. Since the resin for insulation and fixation exists between the temperature sensor 3 and the coil, thermal resistance is generated. Accordingly, deviation occurs between the detection value of sensor temperature T1det and the temperature of the temperature estimation point T2, and it is necessary to estimate temperature with good accuracy.

If the surface of the temperature sensor 3 except the contact part with the coil is thermally insulated with ambient refrigerant by a heat insulating material and the like, similar to Embodiment 1, the temperature estimation unit 33 calculates the estimated temperature T2e of the temperature estimation point, based on the current detection value of sensor temperature T1detnow, the detection value of sensor temperature T1detold before the step time $\Delta T$, and the thermal time constant $\tau$ from the temperature of the temperature estimation point T2 to the sensor temperature T1.

On the other hand, if the heat transfer between the temperature sensor 3 and the ambient of the temperature sensor cannot be ignored, similar to Embodiment 2, the temperature estimation unit 33 calculates the estimated temperature of the temperature estimation point T2e, based on the current correction value of sensor temperature T1crnow calculated based on the current detection value of sensor temperature T1detnow, the correction value of sensor temperature T1crold before the step time $\Delta T$, and the thermal time constant $\tau$ from the temperature of the temperature estimation point T2 to the sensor temperature T1.

In any method, each setting value, such as the thermal time constant $\tau$, the coefficient $\alpha$, the heat capacity C, the thermal resistances R21, R10, and the determination value, is set in accordance with the rotary electric machine 50. Since the estimation method itself is the same as that of Embodiment 1 or 2, explanation is omitted.

4. Embodiment 4

Figure 10:
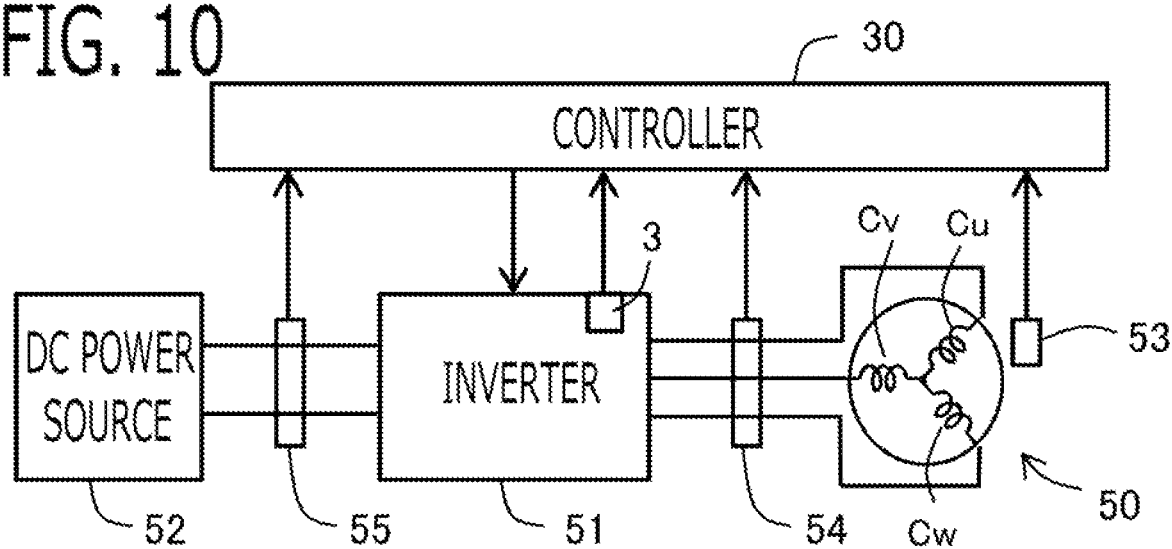
FIG. 10 is a schematic configuration diagram of the rotary electric machine, the inverter, and the controller according to Embodiment 4.

The controller 30 according to Embodiment 4 will be explained. The explanation for constituent parts the same as those in Embodiment 3 will be omitted. The basic configuration of the controller 30 according to the present embodiment is the same as that of Embodiment 3. Embodiment 4 is different from Embodiment 3 in that the temperature estimation object 10 is a power converter (in this example, inverter 51). FIG. 10 is a schematic configuration diagram of the rotary electric machine 50, the inverter 51, the controller 30, and the like.

The temperature estimation object 10 is the inverter 51, and the temperature sensor 3 is attached to the inverter 51. In the present embodiment, the temperature estimation point 11 is set to a point of the inverter 51 where temperature becomes highest, or a point of the inverter 51 where overheat protection is required. For example, the temperature estimation point 11 is the switching device. However, since it is not easy to directly attach the temperature sensor 3 to the switching device, the temperature sensor 3 is attached to a point away from the switching device. Accordingly, deviation occurs between the detection value of sensor temperature T1det and the temperature of the temperature estimation point T2, and it is necessary to estimate temperature with good accuracy.

Similar to the rotary electric machine 50, the inverter 51 is also cooled by fluid of cooling oil or cooling water, or air.

If the surface of the temperature sensor 3 except the contact part with the inverter 51 is thermally insulated with ambient refrigerant by a heat insulating material and the like, similar to Embodiment 1, the temperature estimation unit 33 calculates the estimated temperature T2e of the temperature estimation point, based on the current detection value of sensor temperature T1detnow, the detection value of sensor temperature T1detold before the step time ΔT, and the thermal time constant τ from the temperature of the temperature estimation point T2 to the sensor temperature T1.

On the other hand, if the heat transfer between the temperature sensor 3 and the ambient of the temperature sensor cannot be ignored, similar to Embodiment 2, the temperature estimation unit 33 calculates the estimated temperature of the temperature estimation point T2e, based on the current correction value of sensor temperature T1crnow calculated based on the current detection value of sensor temperature T1detnow, the correction value of sensor temperature T1crold before the step time ΔT, and the thermal time constant τ from the temperature of the temperature estimation point T2 to the sensor temperature T1.

In any method, each setting value, such as the thermal time constant τ, the coefficient α, the heat capacity C, the thermal resistances R21, R10, and the determination value, is set in accordance with the inverter 51. Since the estimation method itself is the same as that of Embodiment 1 or 2, explanation is omitted.

The device control unit 31 suppresses the heat generation of the inverter 51, based on the estimated temperature T2e of the temperature estimation point estimated by the temperature estimation unit 33. For example, when the estimated temperature of the temperature estimation point T2e exceeds the determination value, the device control unit 31 reduces the output torque of the rotary electric machine 50, and reduces the power consumption of the inverter 51.

Example of Conversion (1) In each of the above-mentioned embodiments, there was explained the case where the temperature estimation point 11 is set to one point. However, the temperature estimation point 11 may be set to plural points. And, about the each temperature estimation point, the estimation processing of each of above embodiments may be performed, and the temperature of the each temperature estimation point may be estimated.

(2) In each of the above-mentioned embodiments, there was explained the case where the one temperature sensor 3 is provided, and the one temperature of the temperature estimation point is estimated by the one temperature sensor 3. However, plural temperature sensors 3 may be provided, and one or more temperatures of the temperature estimation points may be estimated by each temperature sensor 3.

(3) In each of the above-mentioned embodiments, there was explained the case where the temperature estimation object 10 is one object. The temperature estimation objects 10 may be plural different objects, the temperature sensor 3 may be attached to each temperature estimation object 10, and the temperature of the temperature estimation point which is set inside each temperature estimation object 10 may be estimated by each temperature sensor 3.

(4) In above-mentioned Embodiment 3, there was explained the case where the temperature estimation point 11 is the coil of the rotary electric machine 50. However, the temperature estimation points 11 may be a part other than the coil of the rotary electric machine 50 (for example, a permanent magnet of the rotor).

(5) In above-mentioned Embodiment 4, there was explained the case where the temperature estimation object 10 is the inverter 51. However, the temperature estimation objects 10 may be various kinds of power converters other than inverter 51 (for example, DC-DC converter).

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A controller, comprising at least one processor configured to implement:
    a sensor temperature detector that detects a sensor temperature based on an output signal of a temperature sensor attached to a temperature estimation object;
    a temperature estimator that calculates an estimated temperature of a temperature estimation point, based on a current detection value of the sensor temperature or a current correction value of sensor temperature calculated based on the current detection value of sensor temperature, a detection value of the sensor temperature before a step time or a correction value of sensor temperature before the step time, and a thermal time constant from a temperature of the temperature estimation point set inside the temperature estimation object to the sensor temperature; and
    further comprising a device controller that controls a power consumption of the temperature estimation object,
    wherein the device controller suppresses a heat generation of the temperature estimation object, based on the estimated temperature of the temperature estimation point.

2. The controller according to claim 1,
wherein, by setting the current detection value of sensor temperature or the current correction value of sensor temperature to T1now, setting the detection value of sensor temperature before the step time or the correction value of sensor temperature before the step time to T1old, setting the thermal time constant to τ, setting the step time to ΔT, and setting the estimated temperature of the temperature estimation point to T2e,
the temperature estimator calculates the estimated temperature of the temperature estimation point using a calculation equation of $$T2e = T1now + \tau \times (T1now - T1old)/\Delta T.$$

3. The controller according to claim 1,
wherein, by setting an ambient temperature of the temperature sensor to T0, setting the detection value of sensor temperature to T1det, setting a coefficient to a, and setting a correction value of the sensor temperature to T1cr, the temperature estimator calculates the correction value of sensor temperature using a calculation equation of $$T1cr = T1det + (T1det - T0) \times \alpha.$$

4. The controller according to claim 3, wherein, by setting a thermal resistance between a sensor part of the temperature sensor and ambient of the temperature sensor to R10, and setting a thermal resistance between the temperature estimation point and the sensor part to R21,
the coefficient is set to a value calculated by a calculation equation of $$\alpha = R10/R21.$$

5. The controller according to claim 3, wherein, by setting an ambient temperature of the temperature sensor in steady state to T0st, setting the sensor temperature in steady state to T1st, and setting a temperature of the temperature estimation point in steady state to T2st,
the coefficient is set to a value calculated by a calculation equation of $$\alpha = (T2st - T0st)/(T1st - T0st).$$

6. The controller according to claim 1, wherein, by setting the thermal time constant to τ, setting a heat capacity of the temperature sensor to C, and setting a thermal resistance between the temperature estimation point and a sensor part of the temperature sensor to R21,
the thermal time constant is set to a value calculated by a calculation equation of $$\tau = C \times R21.$$

7. The controller according to claim 1, wherein the thermal time constant is set to a value calculated based on a measurement data during temperature rise.

8. The controller according to claim 1, further comprising a heating suppressor that suppresses a heat generation of the temperature estimation object based on the estimated temperature of the temperature estimation point,
wherein, by setting the thermal time constant to τ, setting a heat capacity of the temperature sensor to C, and setting a thermal resistance between the temperature estimation point and a sensor part of the temperature sensor to R21,
the thermal time constant is set to a value larger than either one of a value of the thermal time constant calculated by a calculation equation of τ=C×R21, and a value of the thermal time constant calculated based on a measurement data during temperature rise.

9. The controller according to claim 1, wherein the device controller controls a rotary electric machine, and
wherein the temperature estimation object is the rotary electric machine.

10. The controller according to claim 1, wherein the device controller controls a power converter, and wherein the temperature estimation object is the power converter.

11. A control method, comprising:
a sensor temperature detecting that detects a sensor temperature based on an output signal of a temperature sensor attached to a temperature estimation object; and
a temperature estimating that calculates an estimated temperature of a temperature estimation point, based on a current detection value of the sensor temperature or a current correction value of sensor temperature calculated based on the current detection value of sensor temperature, a detection value of the sensor temperature before a step time or a correction value of sensor temperature before the step time, and a thermal time constant from a temperature of the temperature estimation point set inside the temperature estimation object to the sensor temperature; and
controlling a power consumption of the temperature estimation object,
wherein the controlling comprises suppressing a heat generation of the temperature estimation object, based on the estimated temperature of the temperature estimation point.

12. The control method according to claim 11, wherein, by setting an ambient temperature of the temperature sensor to T0, setting the detection value of sensor temperature to T1det, setting a coefficient to a, and setting a correction value of the sensor temperature to T1er,
in the temperature estimating, calculating the correction value of the sensor temperature using a calculation equation of $$T1cr = T1det + (T1det - T0) \times \alpha.$$

13. The control method according to claim 12, further comprising a coefficient setting that, by setting a thermal resistance between a sensor part of the temperature sensor and ambient of the temperature sensor to R10, and setting a thermal resistance between the temperature estimation point and the sensor part to R21,
sets the coefficient to a value calculated by a calculation equation of $$\alpha = R10/R21.$$

14. The control method according to claim 12, further comprising a coefficient setting that, by setting an ambient temperature of the temperature sensor in steady state to T0st, setting the sensor temperature in steady state to T1st, and setting a temperature of the temperature estimation point in steady state to T2st,
sets the coefficient to a value calculated by a calculation equation of $$\alpha = (T2st - T0st)/(T1st - T0st).$$

15. The control method according to claim 11, further comprising a time constant setting that, by setting the thermal time constant to τ, setting a heat capacity of the temperature sensor to C, and setting a thermal resistance between the temperature estimation point and a sensor part of the temperature sensor to R21,
sets the thermal time constant to a value calculated by a calculation equation of $$\tau = C \times R21.$$

16. The control method according to claim 11, further comprising a time constant setting that sets the thermal time constant to a value calculated based on a measurement data during temperature rise.

* * * * *